(12) United States Patent
Desaute

(10) Patent No.: US 8,513,616 B2
(45) Date of Patent: Aug. 20, 2013

(54) RADIOGRAPHIC IMAGING DEVICE AND A DETECTOR FOR A RADIOGRAPHIC IMAGING DEVICE

(75) Inventor: Pascal Desaute, Paris (FR)

(73) Assignee: EOS Imaging, Paris (FR)

( * ) Notice: Subject to any disclaimer, the term of this patent is extended or adjusted under 35 U.S.C. 154(b) by 0 days.

(21) Appl. No.: 13/501,968

(22) PCT Filed: Oct. 15, 2010

(86) PCT No.: PCT/EP2010/065514
§ 371 (c)(1),
(2), (4) Date: Apr. 13, 2012

(87) PCT Pub. No.: WO2011/045411
PCT Pub. Date: Apr. 21, 2011

(65) Prior Publication Data
US 2012/0199752 A1    Aug. 9, 2012

(30) Foreign Application Priority Data
Oct. 15, 2009    (FR) ........................ 09 57243

(51) Int. Cl.
*G01T 1/185*    (2006.01)

(52) U.S. Cl.
USPC ........................ 250/385.1; 250/382

(58) Field of Classification Search
USPC ........................ 250/385.1
See application file for complete search history.

(56) References Cited

U.S. PATENT DOCUMENTS

| | | | |
|---|---|---|---|
| 4,764,679 A | * | 8/1988 | McDaniel et al. .......... 250/374 |
| 4,841,152 A | * | 6/1989 | DiBianca .................... 250/374 |
| 4,996,432 A | * | 2/1991 | Saitou ....................... 250/370.01 |
| 5,347,131 A | * | 9/1994 | Charpak ..................... 250/385.1 |
| 5,521,956 A | * | 5/1996 | Charpak ..................... 378/146 |
| 5,905,264 A | * | 5/1999 | Shahar et al. ............ 250/370.01 |
| 5,959,302 A | * | 9/1999 | Charpak ..................... 250/385.1 |

(Continued)

FOREIGN PATENT DOCUMENTS

| | | |
|---|---|---|
| EP | 0678896 A1 | 10/1995 |
| EP | 0810631 A1 | 12/1997 |
| EP | 1343194 A1 | 9/2003 |
| FR | 2602058 A1 | 1/1988 |
| JP | 2005016988 A | 1/2005 |

OTHER PUBLICATIONS

English Abstract of JP2005016988, Jan. 20, 2005.

(Continued)

*Primary Examiner* — David Porta
*Assistant Examiner* — Djura Malevic
(74) *Attorney, Agent, or Firm* — BCF LLP

(57) ABSTRACT

A radiographic imaging device includes a gas avalanche detector detecting and locating X-ray or gamma ray ionizing radiation. The detector has a gas enclosure with an admission window for admitting incident X-ray photons; an intermediate plane electrode in the enclosure between and parallel to two end plane electrodes thereby forming an amplification space constituting a conversion space where the photons are convertible into electrical charges made up of primary electrons and corresponding ions; the intermediate electrode being operable at an electrical potential relative to the electrical potentials of the end electrodes suitable for generating an electric field causing multiplication of the electrons by the avalanche phenomenon in the amplification space near the intermediate electrode; one of the end electrodes being a collector electrode for picking up the electrical signals induced by the ions; and said window being level with the amplification space and between the intermediate plane and collector electrodes.

15 Claims, 3 Drawing Sheets

(56) References Cited

U.S. PATENT DOCUMENTS

| | | | |
|---|---|---|---|
| 6,069,360 A * | 5/2000 | Lund | 250/370.01 |
| 6,118,125 A * | 9/2000 | Carlson et al. | 250/385.1 |
| 6,198,798 B1 * | 3/2001 | Sauli | 378/98.2 |
| 6,350,989 B1 * | 2/2002 | Lee et al. | 250/370.01 |
| 6,373,065 B1 * | 4/2002 | Francke et al. | 250/374 |
| 6,414,317 B1 * | 7/2002 | Francke et al. | 250/385.1 |
| 6,486,468 B1 * | 11/2002 | Lacy | 250/282 |
| 6,518,578 B1 * | 2/2003 | Francke et al. | 250/374 |
| 6,546,070 B1 * | 4/2003 | Francke | 378/51 |
| 6,627,897 B1 * | 9/2003 | Francke et al. | 250/385.1 |
| 7,134,761 B2 * | 11/2006 | Francke | 362/84 |
| 8,129,688 B2 * | 3/2012 | Karim et al. | 250/370.01 |
| 2003/0155518 A1 * | 8/2003 | Francke | 250/385.1 |
| 2003/0155519 A1 * | 8/2003 | Francke et al. | 250/385.1 |

OTHER PUBLICATIONS

English Abstract of FR2602058, Jan. 29, 1988.
English Abstract of EP0678896, Oct. 25, 1995.
English Abstract of EP0810631, Dec. 3, 1997.
English Abstract of EP1343794, Sep. 10, 2003.

* cited by examiner

RADIOGRAPHIC IMAGING DEVICE AND A DETECTOR FOR A RADIOGRAPHIC IMAGING DEVICE

CROSS-REFERENCE

The present application is a National Phase Entry of International Patent Application No. PCT/EP2010/065514, filed Oct. 15, 2010. Through International Patent Application No. PCT/EP2010/065514, the present application claims priority to French Patent Application No. 09 57243, filed Oct. 15, 2009. The entirety of both of these applications is incorporated herein by reference.

FIELD OF THE INVENTION

The present invention relates to a gas avalanche detector for detecting and localizing X-ray or gamma ray ionizing radiation in radiographic imaging. The present invention also relates to a radiographic imaging device.

BACKGROUND

Conventionally, in radiographic imaging, a beam of X-rays emitted by a source is directed towards a subject to be imaged, such as a patient's body, for example. The beam of X-rays that passes through the subject is detected, and the information obtained is used to produce a representation of the internal structure of the subject. X-ray detectors serve to measure the absorption of the X-ray beam as it passes through the subject, with this absorption being associated with the density of the tissues in the body under examination, or with the density of the materials constituting the objects under study.

Radiographic imaging devices relying on gas avalanche detectors are known. One example of such a device is described in the article published by E. A. Babichev, S. E. Baru, V. V. Grusew, A. G. Khabakhpashev, G. M. Kolachev, G. A. Savinov, L. I. Sekhtman, V. A. Sidorov, A. I. Volobuev entitled "Digital radiographic installation for medical diagnostics", Institute of Nuclear Physics, Novosibirsk, 1989. In that device, the emitted X-rays illuminating the body of an object or a patient for observation are absorbed in a gas space filled with a gas under pressure, said space being bounded by a rectilinear slot formed in a lead plate forming a diaphragm and serving to form a sheet-shaped illumination beam. The ionization electrons produced in the gas space by the absorbed X-rays drift in a drift space under the effect of an electric field towards a multi-wire chamber having wires in a plane parallel to the plane containing the sheet illumination beam delivered by the slot. The wires converge towards the point source of X-ray emission. As a result, ionization electrons coming from a sheet-shaped beam of rays emitted in a given direction by the source are concentrated on one or more wires in the wire chamber. Electronic counter circuits serve to determine the number of pulses per wire, thereby making it possible to obtain a measure of the intensity of the X-rays transmitted in each of the wire directions.

Another example of a radiographic imaging device based on a gas avalanche detector is described in patent EP 0 810 631. The document describes a radiographic imaging device comprising a gas filled detector for detecting ionizing particles. The detector comprises a gas enclosure, for enclosing the gas, provided with a lateral window for admitting the illumination beam. A first electrode, a second electrode, and a third electrode are placed parallel to one another to form in succession two distinct zones: a space for converting the illumination beam into electrons; and an amplification space for amplifying these electrons by multiplication. An entrance window is placed level with the conversion space and enables the illumination beam to be admitted into the conversion space parallel to the first and second electrodes. The electrodes created in the conversion space are directed under the effect of a drift field created between the first electrode and the second electrode towards an amplification space. In the amplification space, these electrodes are subjected to an avalanche phenomenon in the vicinity of the third electrode.

SUMMARY

An object of the present invention is to implement a radiographic imaging device having a gas avalanche detector enabling the resolution and the quality of images obtained by gas detector radiographic imaging devices to be improved.

To this end, a first aspect of the invention provides a gas avalanche detector for detecting and locating X-ray or gamma ray ionizing radiation in radiographic imaging, the detector comprising:

- a gas enclosure provided with an admission window for admitting a beam of incident X-ray photons;
- an intermediate plane electrode placed in said gas enclosure between two end plane electrodes and held parallel to the two end plane electrodes; the configuration of the end plane electrodes and of the intermediate plane electrode forming an amplification space, the amplification space also constituting a conversion space in which the incident X-ray photons are liable to be converted into electrical charges, the electrical charges being made up of primary electrons and of corresponding ions;
- the intermediate electrode being operable at an electrical potential relative to the electrical potentials of the end electrodes suitable for generating an electric field that causes the primary electrons to be multiplied by the avalanche phenomenon in the amplification space in the vicinity of the intermediate electrode;
- one of the end electrodes being configured as a collector electrode for picking up the electrical signals induced by the ions; and
- said admission window being placed level with the amplification space between the intermediate plane electrode and said collector electrode to enable entry of said photon beam between the intermediate plane electrode and said collector electrode.

In a second aspect, the invention provides a radiographic imaging device using X-ray or gamma-ray ionizing radiation, the device comprising:

- a source of ionizing radiation in the form of a diverging beam;
- a first longitudinal slot forming a diaphragm enabling a sheet illumination beam to be delivered that is distributed substantially in a plane containing the longitudinal slot; and
- detector means for detecting a beam of photons transmitted by an object to be observed that is illuminated by the sheet illumination beam;

the device being characterized in that said detector means comprise at least one gas avalanche detector as described above.

The configuration of the detector helps to improve the spatial resolution of radiographic imaging. Since the photons are converted and the resulting charges are picked up in the same zone of the detector, the charges that are generated are picked up close to the point of photon interaction, thereby enabling the level of charge picked up by the collector electrode to be increased.

In preferred embodiments of the invention, recourse may optionally be made to one or more of the following configurations:

the electric field applied between the intermediate electrode and the collector electrode is of moderate intensity, enabling amplification gain of the order of 2 to 300 to be obtained;

the intermediate electrode forms an anode constituted by a plurality of individual anodes;

each individual anode is disposed orthogonally to the beam direction of the incident photons;

the intermediate electrode is placed equidistantly between the two end electrodes;

the intermediate electrode is placed at a distance lying in the range 1 millimeters (mm) to 2 mm between the two end electrodes;

the collector electrode is constituted by a plurality of individual elongate cathodes, the individual cathodes being oriented so as to converge towards a radiation source emitting the beam of incident photons;

the individual cathodes are segmented in a longitudinal direction;

two successive segments in the depth direction of the detector are disposed in a staggered configuration relative to each other;

the individual cathodes are disposed at a distance of about 25 micrometers ($\mu$m) to about 150 $\mu$m from one another so that the set of individual cathodes is equivalent to a continuous plane for the electric field set up by the electrodes;

the gas enclosure contains a high atomic number rare gas, such as for example Xenon;

the gas enclosure also contains a small quantity of an organic gas;

the gas in the gas enclosure is under pressure in order to increase the fraction of photons converted into electrical charges; and the radiographic imaging device also includes a second longitudinal slot forming a diaphragm enabling a sheet illumination beam to be delivered that is distributed substantially in a plane containing the second longitudinal slot, the second slot being located between the object for observation and the detector means, the first slot being located between the object for observation and the source of ionizing radiation.

The radiographic imaging device and the detector of the invention find applications relating both to medical radiographic imaging and also to industrial radiographic imaging, in particular in crystallography and in strength of materials.

BRIEF DESCRIPTION OF THE DRAWINGS

The invention may be better understood on reading the following description and with reference to the attached drawings, in which.

DETAILED DESCRIPTION

A more detailed description of a radiographic imaging device according to an embodiment of the present invention is given below with reference to FIGS. 1 and 2.

Figure 1:
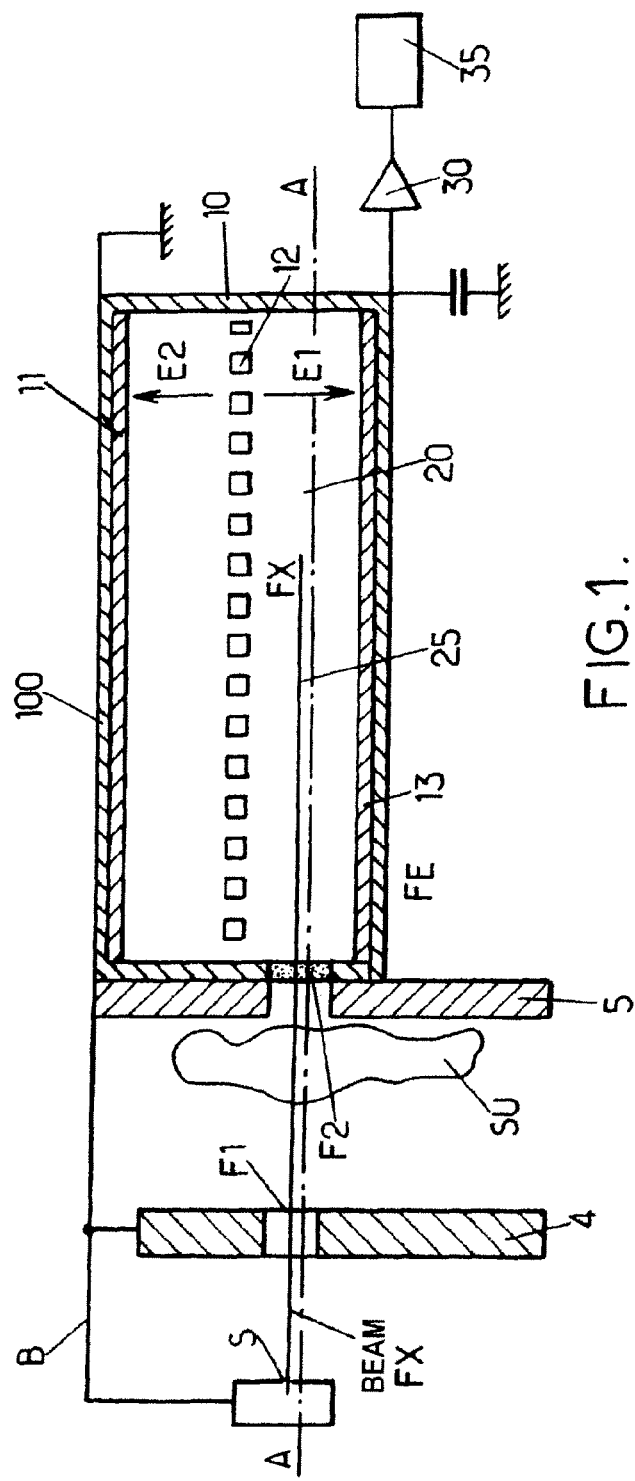
FIG. 1 is a schematic sectional view of a first embodiment of the radiographic imaging device of the present invention.
Figure 2:
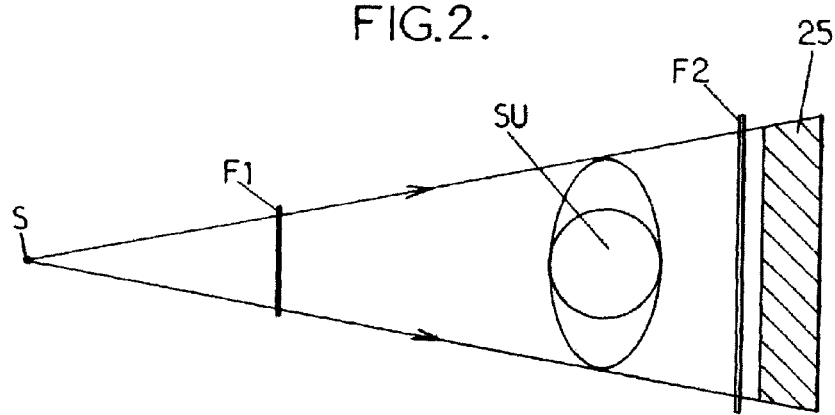
FIG. 2 is a schematic and partial sectional view on a cross-section plane AA of FIG. 1.

FIG. 1 is a section view on a longitudinal plane of symmetry of the device. As can be seen in FIG. 1, the device in this embodiment of the invention includes a source of ionizing radiation, referenced S, for delivering ionizing radiation as a diverging beam. In a typical application of the invention, the source S is assumed to be a point source of X-rays or gamma rays of energy lying in the range 40 kiloelectron volts (keV) to 140 keV. The device also includes a source collimator 4 defining a longitudinal slot referenced F1, which slot extends orthogonally to the plane of the sheet on which FIG. 1 is drawn. The slot F1 forms a diaphragm, serving to deliver a diverging illuminating beam in the form of a sheet of X-rays or gamma rays that are distributed substantially in the plane that contains the longitudinal slot F1. The above-mentioned illumination beam serves to illuminate a portion of a subject SU for observation. As shown in FIG. 2, the planar-shaped beam propagates in a solid angle of aperture defined by the collimation slot F1, the angular aperture being sufficient to cover the width of the subject SU. A detector module is provided to receive and detect the beam transmitted through the subject SU (e.g. the body of a patient) after selective absorption as a function of density zones in the subject SU for observation. An object collimator 5 containing a longitudinal slot F2 in alignment with and parallel to the slot F1 of the source collimator 4 serves to eliminate the diffuse radiation generated by the subject SU, which diffuse radiation generally constitutes a large fraction of the signal picked up by a two-dimensional detector.

The detector module includes at least one ionizing particle detector 100 comprising a gas enclosure 10 having an admission window FE for admitting the sheet illumination beam. The admission window FE is in alignment with and parallel to the slots F1 and F2 and it serves to allow the beam FX of X-ray photons to enter into the enclosure 10 of the detector with excellent transmission, while guaranteeing gastightness for gas under pressure or at atmospheric pressure.

The detector 100 has a depth in the direction of the incident illumination beam so as to enable a large portion of the incident radiation to interact with the gas in order to generate primary ionization electron-ion pairs in the detector. This depth may be of the order of 5 centimeters (cm) to 50 cm, for example.

The gas enclosure 10 is an enclosure of conventional type provided with elements for admitting a filler gas, these admission elements not being shown in the drawings in order to avoid overcrowding them. In conventional manner, the gas admitted into the gas enclosure may be admitted at a pressure that is relatively high compared with atmospheric pressure. By way of example, the pressure of this gas may lie in the range of about 5 bar to about 20 bar.

The gas admitted into the enclosure 10 is made up of an ionisable gas enabling electrons and corresponding ions to be generated as a result of the gas being illuminated by the transmitted ionizing beam FX, and allowing charge to be amplified by the "Townsend avalanche phenomenon" that is well known to the person skilled in the art. For this purpose, the gas may be a mixture of a high atomic number rare gas, e.g. such as xenon, at a pressure higher than atmospheric pressure in order to ensure good ability for converting X-ray photons of the beam FX into electrons, together with a small quantity of an organic gas, e.g. such as $C_2H_6$, which gas constitutes the quencher substance that serves to stabilize the operation of avalanche effect amplification.

The detector 100 is described in greater detail with reference to FIGS. 1 and 3. The gas enclosure 10 has a first electrode, referenced 11, a second electrode, referenced 12, and a third electrode, referenced 13, these electrodes being plane and placed parallel to one another. The second electrode 12 is disposed symmetrically between the first electrode 11 and the third electrode 13, being equidistant to those two electrodes.

The first electrode 11 and the third electrode constitute respective cathodes, while the second electrode 12 constitutes an anode. The configuration of these three electrodes forms a sensing space 20 in which the photons of the illumination beam FX are converted by ionizing gas into primary electrons and positive ions.

This sensing space 20 also constitutes an amplification space formed by the configuration of the three electrodes for multiplying the primary electrons by an avalanche phenomenon.

In the example shown in FIG. 1, the first cathode electrode 11 is constituted by a continuous plane of gold-plated copper that is maintained in this example at a potential of about 0 volts (V).

Figure 3:
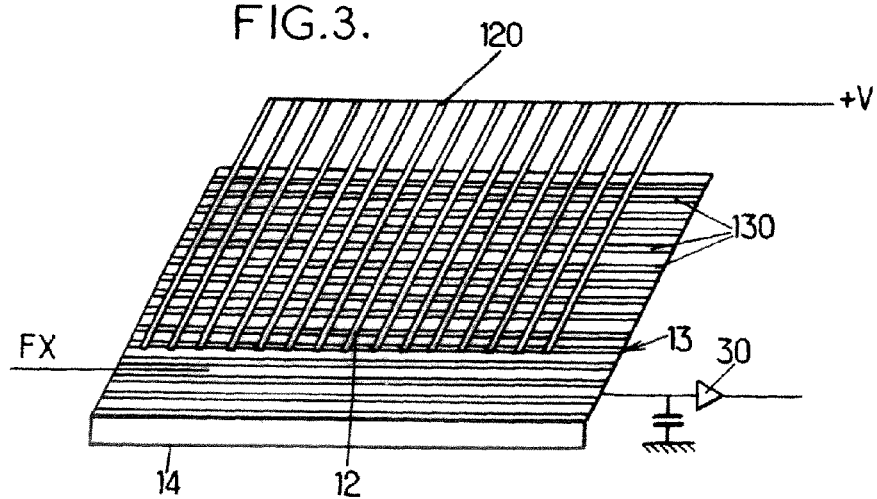
FIG. 3 is a perspective view of the configuration of the anode electrode and the collector electrode of the detector of the radiographic imaging device, in the first embodiment of the present invention.
Figure 4:
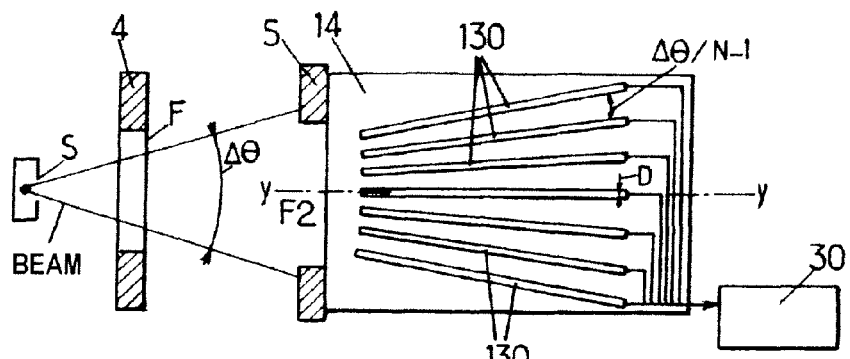
FIG. 4 is a section view on cross-section plane AA of FIG. 1 in the first embodiment of the invention.

As shown in FIG. 3, the third electrode 13, a cathode, comprises a set of individual cathodes 130 spaced apart from one another on an electrically insulating support 14. The individual cathodes 130 are constituted by electrically conductive tracks etched on an electrically insulating substrate. The electric potential of the individual cathodes 130 is maintained close to 0 V by integration electronics. Each cathode track 130 is thus suitable for picking up a charge signal induced by the positive ions, which signal will define the value given to each pixel in a line of the image along the transmitted beam FX. The spacing between the cathode tracks 130 is generally limited by the etching technique used. As shown in FIG. 4, the cathode tracks 130 are disposed so as to converge towards the source S in such a manner that each cathode track 130 has a direction that passes through the source S. Such a disposition makes it possible to eliminate substantially parallax error due to the plane of the illumination beam FX being projected onto the plane of the third electrode 130, thereby ensuring that images are acquired without any significant parallax defects. The spacing between two tracks is sufficiently small (e.g. in the range 25 µm to 150 µm) to ensure that the set of electrodes 130 is equivalent to a continuous plane for the electric field E1, E2 established by the set of electrodes 11, 12, and 13.

The second electrode 12, the anode, comprises a set of individual anodes 120 that are spaced apart from one another so as to constitute a grid for proportional multiplication of the electrons. The anode electrode 12 serves to generate multiplied electrons and the corresponding ions by an avalanche phenomenon localized in the vicinity of the individual anodes 120. The wires 120 are disposed orthogonally to the main direction of the flux FX of photons, i.e. orthogonally to the main direction of the tracks 130 and spaced apart by a distance of the order of a few millimeters, for example. This disposition of the wires makes it possible to obtain a charge amplification function that is uniform and continuous (not made discrete) in the direction orthogonal to the tracks, thus making it possible to avoid having spatial resolution limited by the pitch between two wires.

The plane of anode wires 120 is disposed symmetrically at the center of the space between the cathode electrodes. According to an advantageous characteristic of the device, the plane of anode electrodes 120 is disposed at a distance of about 1 mm to 2 mm from each electrode 11 and 13. This disposition is favorable to ensuring equilibrium between the electrostatic forces that are applied to the wires.

The admission window FE may be placed laterally on the gas enclosure 10 level with the sensing space between the second electrode 12 and the third electrode 13, thus enabling the illumination beam to be admitted into the sensing space 20 parallel to the second and third electrodes 12 and 13 in the embodiment of FIG. 1. Naturally, in other embodiments the admission window FE could be placed laterally on the gas enclosure 10 level with the sensing space between the second electrode 12 and the first electrode 11 if the first electrode 11 is configured so as to collect the charge signals generated by the avalanche.

The device in this embodiment includes a bias circuit enabling the first electrode 11 to be taken to a first electrical potential HV1, the second electrode 12 to a second electrical potential HV2 higher than the first, and the third electrode 13 to a third electrical potential HV3 lower than the second electrical potential. In the example shown, the electrodes 11 and 13 are grounded and the potential HV2 is positive. By way of example, the positive potential HV2 lies in the range 2000 V to 3000 V for a filling of xenon gas at a pressure of about 6 bar.

The X-ray photons admitted into the detector 100 are converted into primary electrons and positive ions directly in the gas under pressure by ionization in a sensitive interaction zone 25 defined by the position of the source S, by the collimation F2, and by the end electrodes 11 and 13. This sensitive zone 25 is typically situated halfway between the second electrode and the third electrode 13 so as to convert photons into electrical charges (primary electrons and corresponding ions) in a so-called "drift" zone where the charges are initially subjected to movement without any amplification effect. The primary electrons then move towards the anode wires 120 following the lines of the electric field as defined between the cathode 13 and the anode 12, while the positive ions move towards the tracks 130 of the cathode 13. The gas under pressure in association with the electric field imparted by the electrodes 11, 12, and 13, also serve to amplify the number of electrical charges by the Townsend avalanche effect in the vicinity of the anode wires 120. The positive ions created during the avalanche then move towards the cathode tracks 130 following the electric field lines.

The electrodes 130 thus pick up the positive ions created by the primary ionization and by the avalanche effect amplification. These ions serve to induce corresponding electrical pulses on the individual cathodes 130, which pulses, on being appropriately processed, then enable the direction of the transmitted ionizing illumination radiation to be located. Thus, each individual cathode is coupled to an electronic detector circuit including a charge amplifier stage 30, each amplifier being connected to an individual cathode 130 and delivering an electrical detection signal for the individual cathode in question. The output from each amplifier may be coupled to a digitizing circuit or to a counter circuit. The electronic circuit thus serves to generate a digital signal that is proportional to the number of ions picked up in a given length of time and/or of counting the number of pulses generated.

The advantage of placing the admission window FE between the second electrode 12 and the collection third electrode 13 lies in particular in taking advantage of an avalanche amplification property generated by the electric fields E1 and E2 between the electrodes 12 and 13. During the avalanche, the electrons move in the opposite direction to the electrical field E1 and thus the electrons go towards the electrode 12, while the ions produced by the avalanche move in the direction of the field E1 and thus move away from the electrode 12. As a result, the charge of ions created by avalanche in the vicinity of the electrode 12 travels in the opposite direction to the electrons, and crosses the entire space between the second electrode 12 and the third electrode 13, passing via the point of the original interaction that created the primary electrons.

For an electrode 12 that is a continuous plane, the charge of ions created by the avalanche would travel in full in the opposite direction to electron arrival. When the electrode 12 is constituted by a plurality of wires, a large fraction of the charge of ions created by avalanche in the vicinity of the wires will move in the direction opposite to electron arrival, but a small fraction of the charge of ions will pass through the plane of the electrode 12 by a diffusion effect and will then follow the electric field E2, thus heading towards the primary electrode 11. This charge fraction that is picked up by the primary electrode 11 thus represents a potential loss of signal. Furthermore, charge diffusion, in particular during the stage of transport without amplification and during the stage of avalanche amplification tends to degrade the spatial resolution of the detector. In order to minimize the charge fraction that passes through the plane of the electrode 12 constituted by a plurality of wires under the effect of charge diffusion in the vicinity of the wires, it is preferable to select a mode of amplification using a moderate electric field, typically leading to an amplification gain of a few units to a few hundreds of units. Selecting a moderate electric field also serves to reduce loss of spatial resolution by charge diffusion, in particular in the vicinity of the wires.

Thus, placing the admission window FE between the second electrode 12 and the third electrode 13 serves to maximize the total charge that is picked up by the cathodes 130 for each event, and thus to maximize the signal-to-noise ratio. This configuration enhanced by selecting a moderate electric field also leads to minimizing the loss of spatial resolution by diffusion. This thus enables signal processing and image quality to be improved.

The depth of the sensitive zone of the detector coupled with the pressure of the high atomic number rare gas ensures excellent efficiency in the conversion of X-rays into primary electrons. Furthermore, the pressure of the high atomic number rare gas also serves to reduce the size of the mean ball of charge obtained for each interaction of a X-ray photon in the gas, thereby improving the spatial resolution of the detector.

For mechanically mounting the anode second electrode 12 and in order to ensure that it has sufficient mechanical strength, in particular in the presence of electrostatic forces exerted by the electric bias fields, electrically insulating spacers may be provided for large areas in the amplification space 20 between the second electrode and the third electrode 13 in order to hold the anode 12. The electrically insulating spacers may be made of quartz threads, for example, having a diameter corresponding to the multiplication distance between the two planes of electrodes.

Figure 5:
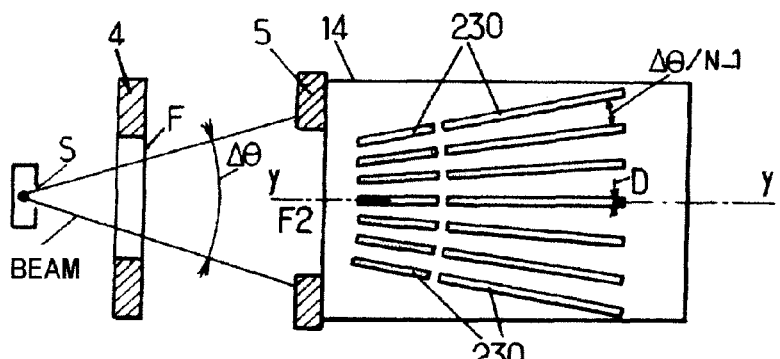
FIG. 5 is a section view on section plane AA of the radiographic imaging device in a second embodiment of the invention.

FIG. 4 shows that the electrically conducive elements forming the individual cathodes 130 are spaced apart regularly in the aperture angle of the illumination beam. Each individual cathode 130 may itself be connected to the detector and counter or digitizing circuit. In a variant embodiment shown in FIG. 5, it may also be mentioned that the electrically conductive elements constituting the individual cathodes may themselves be subdivided into segments 230 in the depth direction of the detector along the longitudinal axes of the cathodes. Each cathode segment 230 may constitute an individual cathode and may be connected to a single charge amplifier. Thus, the number of electronic channels is increased, from one channel per track to n channels per track, where n is the number of cathode segments per cathode track. A potential application of such an arrangement is to perform discrimination on the basis of X-ray photon energy thus making it possible to perform or improve the dual-energy X-ray absorptiometry (DXA) method since the distribution in the depth direction of charge deposition in the detector as a result of photon interactions is a function of the energy spectrum of the incident X-ray photons.

Figure 6:
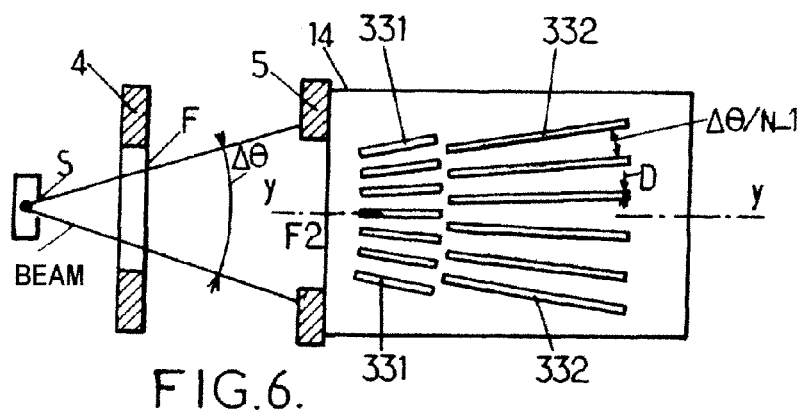
FIG. 6 is a section view on section plane AA of the radiographic imaging device in a third embodiment of the invention.

In another variant embodiment, shown in FIG. 6, the segments 331 of the first "layer" or "rank" of cathode segments are not exactly in register with the segments 332 of the following layer, but are rather in a staggered configuration, thereby obtaining improved spatial resolution while also obtaining spectral information. This is because, in the present state of printed circuit etching technology, it is possible to envisage a circuit with segments being split depthwise into two while simultaneously multiplying the pitch of the track by two so as to keep constant the number of electronic channels. Nevertheless, under such circumstances there would be a potential loss of resolution by a factor of two, specifically unless it is possible to put the segments into a staggered configuration and recover resolution by signal processing and interpolation, while also obtaining information concerning energy.

It can readily be understood that using the assembly constituted by the source S, the slot F1, and the slot F2, e.g. as embodied using lead diaphragms, plus the detector module 100, can be held together by a frame B, with this assembly then being capable of being moved in translation, and where appropriate in rotation, so as to scan the subject SU appropriately. The mechanical configuration of the assembly is not described in detail since the elements needed for making this configuration are known to the person skilled in the art. In addition, the source S and the detector module 1 could be stationary, with the subject SU being moved appropriately.

In a variant, a radiographic imaging device may be made up of a plurality of detectors 100 stacked one on another. The radiographic imaging detect of the invention, in the embodiments described in the description, enables scans to be undertaken with great accuracy such as those required for diagnostic applications.

It will be appreciated that the invention is not limited to the embodiments described above and shown, and other embodiments and implementations may be derived therefrom without thereby going beyond the scope of the invention as defined by the appended claims.

The invention claimed is:

1. A gas avalanche detector for detecting and locating X-ray or gamma ray ionizing radiation in radiographic imaging, the detector comprising:
   a gas enclosure provided with an admission window for admitting a beam of incident X-ray photons;
   an intermediate plane electrode placed in said gas enclosure between two end plane electrodes and held parallel to the two end plane electrodes; a configuration of the end plane electrodes and of the intermediate plane electrode forming an amplification space, the amplification space also constituting a conversion space in which the incident X-ray photons are convertible into electrical charges, the electrical charges being made up of primary electrons and of corresponding ions;

the intermediate plane electrode being operable to be at an electrical potential relative to electrical potentials of the end plane electrodes suitable for generating an electric field that causes the primary electrons to be multiplied by an avalanche phenomenon in the amplification space in a vicinity of the intermediate plane electrode;

one of the end plane electrodes being configured as a collector electrode for picking up electrical signals induced by the ions; and said admission window being placed level with the amplification space between the intermediate plane electrode and said collector electrode for admission of said beam of incident X-ray photons between the intermediate plane electrode and said collector electrode.

2. A detector according to claim 1, wherein the electric field applied between the intermediate plane electrode and the collector electrode is of moderate intensity, enabling an amplification gain of an order of 2 to 300 to be obtained.

3. A detector according to claim 1, wherein the intermediate plane electrode forms an anode constituted by a plurality of individual anodes.

4. A detector according to claim 3, wherein each individual anode is disposed orthogonally to a beam direction of the incident X-ray photons.

5. A detector according to claim 1, wherein the intermediate plane electrode is placed equidistantly between the two end plane electrodes.

6. A detector according to claim 5, wherein the intermediate plane electrode is placed at a distance lying in a range of from 1 mm to 2 mm between the two end plane electrodes.

7. A detector according to claim 1, wherein the collector electrode is constituted by a plurality of individual elongate cathodes, the individual cathodes being oriented so as to converge towards a radiation source emitting the beam of incident X-ray photons.

8. A detector according to claim 7, wherein the individual cathodes are segmented in a longitudinal direction in a depth direction of the detector.

9. A detector according to claim 8, wherein two successive segments in the depth direction of the detector are disposed in a staggered configuration relative to each other.

10. A detector according to claim 7, wherein the individual cathodes are disposed at a distance of about 25 μm to about 150 μm from one another so that a set of individual cathodes is equivalent to a continuous plane for the electric field set up by the plane electrodes.

11. A detector according to claim 1, wherein the gas enclosure contains Xenon.

12. A detector according to claim 11, wherein the gas enclosure further includes an organic gas.

13. A detector according to claim 1, wherein gas in the gas enclosure is at a pressure greater than atmospheric pressure in order to increase a fraction of photons converted into electrical charges.

14. A radiographic imaging device using X-ray or gamma-ray ionizing radiation, the device comprising:

a source of ionizing radiation in a form of a diverging beam;

a first longitudinal slot forming a diaphragm enabling delivery of a planar illumination beam distributed substantially in a plane containing the first longitudinal slot; and detector means for detecting a beam of photons transmitted by an object to be observed that is illuminated by the planar illumination beam;

wherein said detector means comprise at least one gas avalanche detector according to claim 1.

15. A radiographic imaging device according to claim 14, further including a second longitudinal slot forming a diaphragm enabling delivery of a planar illumination beam that is distributed substantially in a plane containing the second longitudinal slot, the second longitudinal slot being located between the object for observation and the detector means, the first longitudinal slot being located between the object for observation and the source of ionizing radiation.

* * * * *